United States Patent [19]
Celada et al.

[11] 3,890,142
[45] June 17, 1975

[54] METHOD FOR GASEOUS REDUCTION OF METAL ORES

[75] Inventors: Juan Celada; Patrick W. MacKay, both of Monterrey, Mexico

[73] Assignee: Fierro Esponja, S.A., Monterrey, Mexico

[22] Filed: Oct. 16, 1973

[21] Appl. No.: 406,805

[52] U.S. Cl. .................................. 75/91; 75/35
[51] Int. Cl. ........................................ C21b 13/02
[58] Field of Search ........... 75/34, 91, 35, 90 R 75/1

[56] References Cited
UNITED STATES PATENTS

| | | | |
|---|---|---|---|
| 2,900,247 | 8/1959 | Celada ................................... | 75/34 |
| 2,997,383 | 8/1961 | Whalez ................................... | 75/35 |
| 3,094,410 | 6/1963 | Clement et al. ..................... | 75/91 X |
| 3,128,174 | 4/1964 | Celada ................................... | 75/34 |
| 3,136,623 | 6/1964 | Mader et al. ........................... | 75/34 |
| 3,136,624 | 6/1964 | Mader et al. ........................... | 75/34 |
| 3,136,625 | 6/1964 | Mader et al. ........................... | 75/34 |
| 3,423,201 | 1/1969 | Celada et al. .......................... | 75/35 |
| 3,765,872 | 10/1973 | Celada et al. ......................... | 75/35 X |
| 3,770,421 | 11/1973 | Celada et al. ......................... | 75/35 X |
| 3,779,741 | 12/1973 | Celada et al. ......................... | 75/35 |

Primary Examiner—Allen B. Curtis
Attorney, Agent, or Firm—Curtis, Morris & Safford

[57] ABSTRACT

An improvement in a method for the batchwise gaseous reduction of metal oxides, e.g., iron ore to metals, e.g., sponge iron, in a multiple unit reactor system of the type in which separate bodies of metal-bearing material are simultaneously treated in one or more charging reactors, reduction reactors and cooling reactors and a reducing gas is passed successively through the cooling and reduction reactors. The reducing gas is recirculated in both the cooling reactor and the reducing reactor to increase the mass flow rate of the gas. By recycling the gas to the reduction reactor acceptable reduction can be achieved in a shorter period of time and with a single reactor. Also the temperature gradient through the bed is reduced thus producing a higher average temperature in the bed for a given inlet temperature and more nearly uniform metallization is obtained.

9 Claims, 2 Drawing Figures

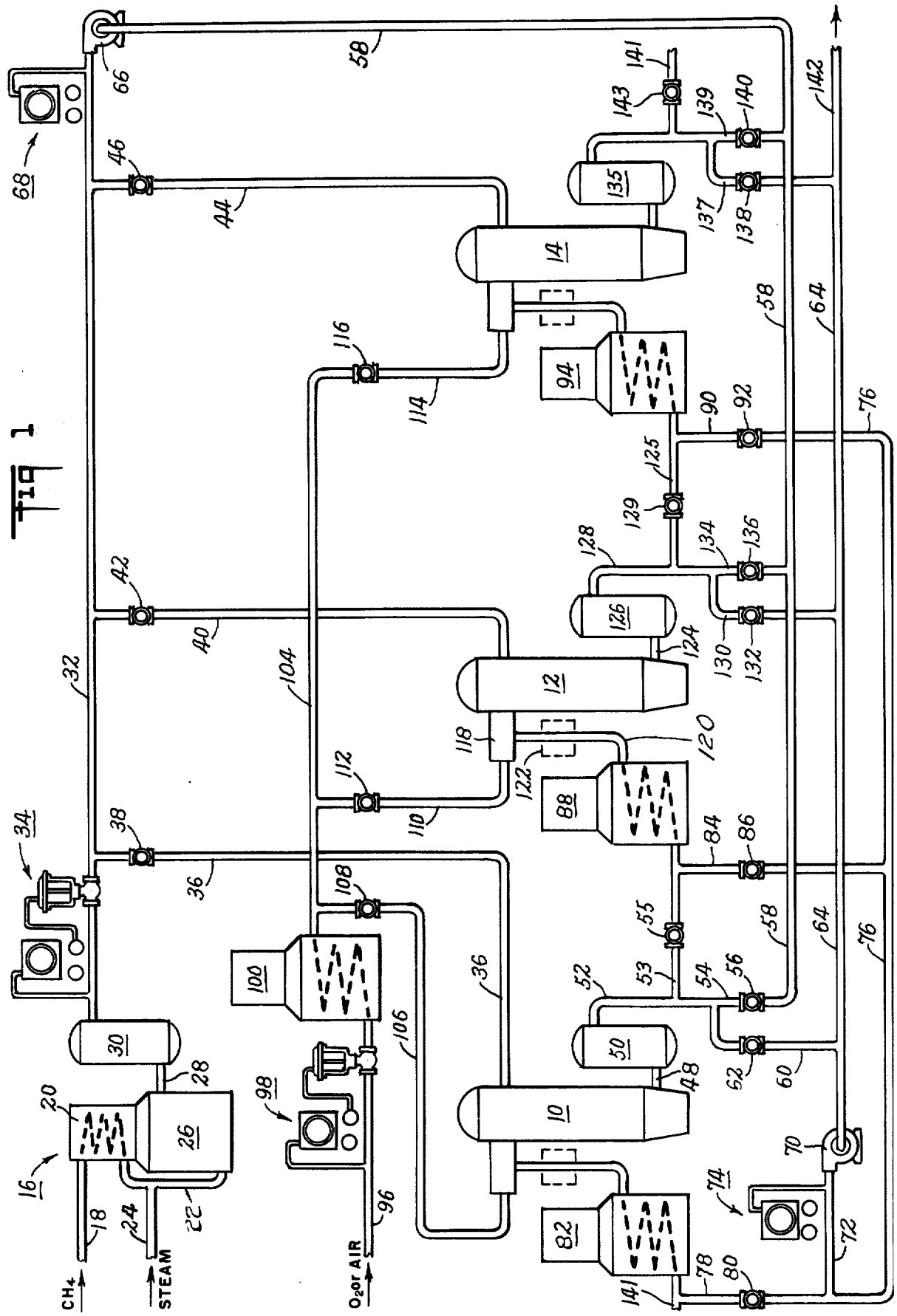

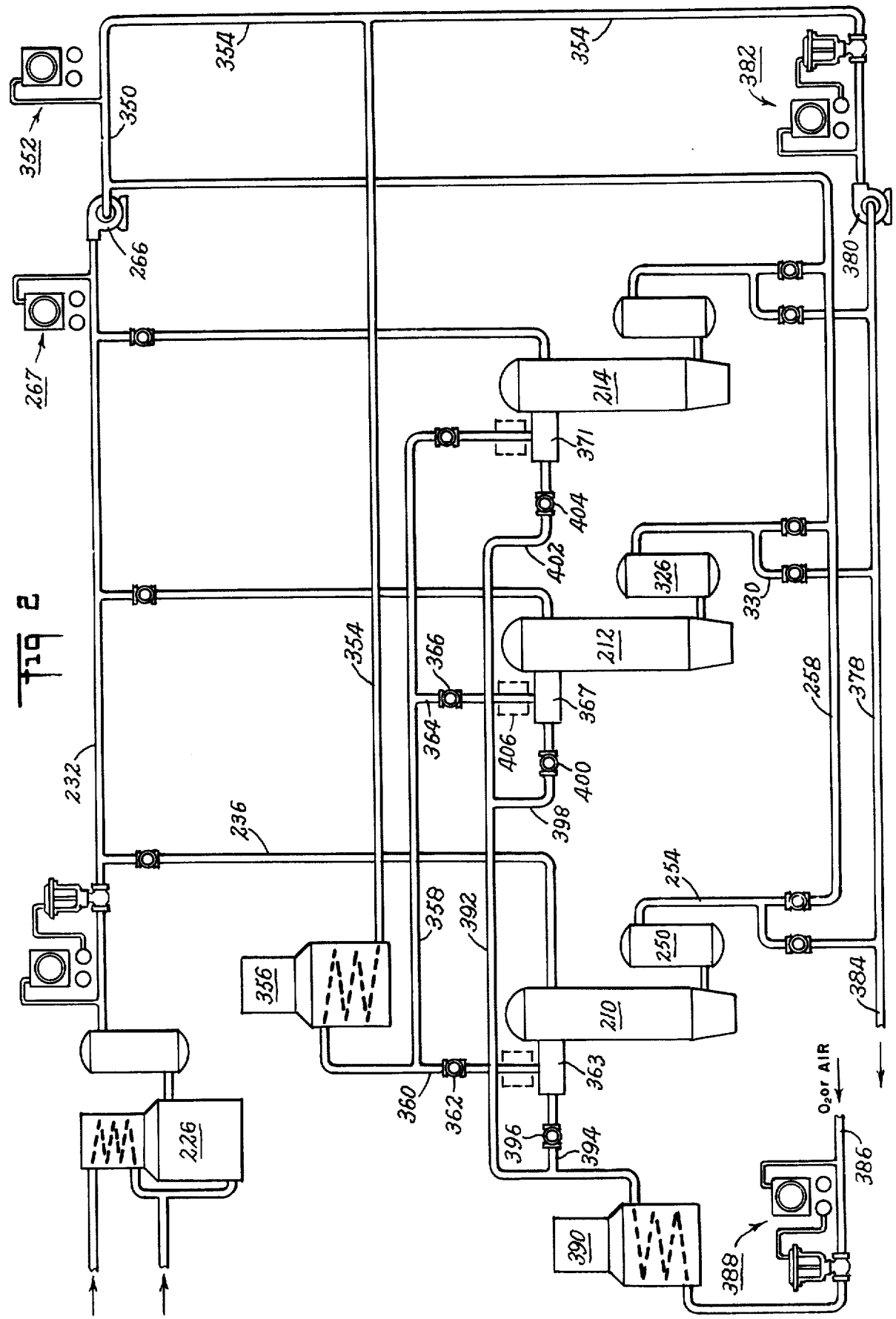

METHOD FOR GASEOUS REDUCTION OF METAL ORES

This invention relates to the gaseous reduction of metal oxides to elemental metals at elevated temperatures below the melting point of the metals and more particularly, to an improved method of operating a multi-unit reactor system for effecting such a reduction process. The invention is especially useful in connection with the direct gaseous reduction of iron oxide ores in lump or pellet form to sponge iron and will be illustratively described in connection with this use, although as the description proceeds, it will become apparent that the invention can be equally well used in processes wherein metal oxides other than iron oxide are reduced to elemental metals.

In one of its aspects the present invention comprises an improvement in a known type of semi-continuous process for producing sponge iron wherein a multiple unit reactor system is used in which separate bodies of ferrous material are treated simultaneously. The three principal operations carried out in the reactor system are (1) unloading the reduced metal from the reactor and recharging it with fresh metal ore to be reduced, (2) reduction of the ore and (3) cooling of the reduced ore. For convenience these three operations are characterized herein as the production stage, the reduction stage and the cooling stage. The reactors are so connected that during a given cycle of operation reducing gas from a suitable source, commonly a mixture largely composed of carbon monoxide and hydrogen, flows successively through at least one reactor that is at the cooling stage and several reactors that are at the reducing stage. At least one reactor of the system is disconnected therefrom for unloading the re-loading while the cooling and reducing operations are carried out in the other reactors of the system. It is evident that a minimum of three reactors is required to carry out simultaneously the three operations described above.

The reactor system is provided with suitable switching valves whereby at the end of each cycle the gas flow can be shifted to cause the cooling stage reactor to become the charging reactor, the last stage reduction reactor to become the cooling reactor and the charging reactor to become the first stage reduction reactor.

In order to achieve efficient utilization of the reactors in such a system, it is necessary that the three operations referred to above be carried out in approximately the same length of time. If, for example, the time required to cool the reduced metal or to reduce the metal ore is substantially longer than that required to unload and re-load the charging reactor, the charging reactor will remain idle for a period of time while the cooling and reducing steps are being completed. In general, the reduction of the iron ore is the most time-consuming portion of the process. Hence in order to achieve approximately equal time intervals for the three operations, it has previously been necessary to carry out the ore reduction in multiple stages using two or more reduction reactors connected in series in respect to reducing gas flow.

It is an object of the present invention to provide an improved method for the batch-wise, semi-continuous gaseous reduction of metal ores in a multiple reactor system. It is another object of the invention to provide a method of equalizing the time intervals required to reduce the metal ore, cool the reduced metal ore and unload and recharge the loading reactor. It is a further object of the invention to provide a method whereby such equalization can be achieved in a three reactor system. Other objects of the invention will be in part obvious and in part pointed out hereafter.

The objects of the invention are achieved, in general, by a controlled recycling of the reducing gas in the ore reduction stage of the system thereby increasing the mass flow rate of reducing gas in the reduction reactor or reactors and decreasing the time required to obtain a given degree of reduction.

The objects and advantages of the present invention may best be understood and appreciated by reference to the accompanying drawings which illustrate apparatus capable of being used in carrying out the invention and wherein:

FIG. 1 illustrates a three-reactor reduction system of the general type described above and means for providing a controlled gas recycle to both the cooling reactor and the reduction reactor; and FIG. 2 illustrates a system similar to that of FIG. 1 but wherein a single reducing gas heater serves all three of the reactors.

Referring to the drawings and particularly to FIG. 1, the system there shown comprises the reactors 10, 12 and 14. The system will be initially described during that part of the cycle in which reactor 10 is the cooling reactor, reactor 12 is the reduction reactor and reactor 14 is the charging reactor.

Referring to the left side of FIG. 1, a reducing gas composed largely of carbon monoxide and hydrogen is generated in a reformer 16 of known construction. Methane or natural gas from a suitable source is supplied through pipe 18 and is preheated in the stack portion 20 of the reformer. It then flows through pipe 22 wherein it is mixed with steam supplied through pipe 24 and the methane-steam mixture enters the lower portion 26 of the reformer. In the lower section 26 of the reformer the methane-steam mixture is catalytically converted at an elevated temperature and in known manner into a reducing gas composed largely of carbon monoxide and hydrogen.

The resulting gas mixture flows through pipe 28 to a quench cooler 30 wherein it is cooled and dewatered and then to the reducing gas header 32 which contains a back pressure controller 34. The header 32 is connected by branch pipe 36 containing valve 38 with the top of reactor 10, by a branch pipe 40 containing valve 42 to the top of reactor 12, and by a branch pipe 44 containing valve 46 to the top of reactor 14. During the portion of the cycle now being described, valves 42 and 46 are closed and valve 38 is open.

The body of ferrous material in cooling reactor 10 has already been larely reduced in a previous reducing operation and may have a degree of metallization within the range 80 percent to 99 percent. The cool reducing gas supplied to the top of reactor 10 through pipe 36 flows downwardly through the bed of ferrous material and cools and further reduces it. Also during the early part of the cooling cycle the temperature of the bed is sufficiently high to crack a portion of the reducing gas and deposit carbon on the surfaces of the sponge iron particles. This carbon deposition is advantageous in cases, for example, where the sponge iron is to be used as a source of iron units in an electric arc steel-making furnace.

The reducing gas leaves reactor 10 near the bottom thereof through pipe 48 and flows through quench cooler 50 wherein it is cooled and de-watered to pipe 52. It is then divided. A first portion flows through pipe 54 containing open valve 56 to the cooling gas recycle header 58. The remainder of the gas from pipe 52 flows through transfer pipe 53 containing open valve 55 to the reducing gas recycle pipe 84 of the reduction reactor system 12. Valve 62 in pipe 60 is closed during this portion of the cycle.

The cooling gas recycle header 58 is connected to the suction of a cooling gas recycle pump 66, the discharge of which is connected to a reducing gas header 32. A flow meter 68 is provided at the discharge side of pump 66 to indicate the amount of gas that is being recycled to reactor 10. The volumetric ratio of recycled cooled gas to gas supplied from the reformer may vary over a fairly wide range, typically from 1:1 to 5:1. In terms of the total gas flowing through reactor 10, the recycled gas may comprise from 40 percent to 90 percent by volume. By using a high recycle ratio the rate of cooling in reactor 10 can be substantially increased. If desired, the flow rate of the recycled cooling gas can be varied to produce a two-stage cooling of the contents of reactor 10 as disclosed in Celada U.S. Pat. No. 3,423,201.

As indicated above, each of the reactors is provided with means for recirculating reducing gas therethrough when it is operating as a reduction reactor. To this end a reducing gas recirculating header 76 (shown near the bottom of FIG. 1) is provided. Also each of the reactors 10, 12 and 14 is provided with a heater for heating the reducing gas supplied thereto. The supply header 76 is connected by branch pipe 78 containing valve 80 to the heater 82 of reactor 10; by the branch pipe 84 containing valve 86 to the heater 88 of reactor 12; and by the branch pipe 90 containing valve 92 to the heater 94 of reactor 14. During the portion of the cycle now being described, valves 80 and 92 are closed and valve 86 is open.

Within the heater 88 the reducing gas, including both the gas transferred from the cooling reactor system through pipe 53 and the gas flowing from header 76 through pipe 84, is heated to a temperature of 700° to 850°C. Since the desired reducing gas temperature at the entrance to reduction reactor 12 is 900° to 1100°C., further heating of the gas leaving heater 88 is required. This additional heating can be achieved in either of two ways, namely, by adding a relatively small amount of an oxygen-containing gas to the reducing gas to produce the desired additional heat by partial combustion of the reducing gas, or by interposing a superheater between the primary gas heater and the reactor.

Considering the first alternative and referring to the top left-hand portion of FIG. 1, an oxygen-containing gas which may be air or oxygen is supplied through a pipe 96 containing a flow controller 98 to a heater 100 from which it is discharged into a hot air header 104. As shown in the drawing, the header 104 is connected to reactor 10 by a branch pipe 106 containing valve 108, to reactor 12 by a branch pipe 110 containing a valve 112 and to reactor 14 by a branch pipe 114 containing a valve 116. However, for the portion of the cycle now being described, valves 108 and 116 are closed and valve 112 is open. Thus all of the oxygen-containing gas passing through heater 100 flows through branch pipe 110 to a combustion chamber 118 communicating with the top of reactor 12. The heated gas leaving heater 88 likewise flows to combustion chamber 118 through a pipe 120. Within the combustion chamber a portion of the hot-reducing gas is burned to provide a reducing gas mixture having the desired relatively high temperature. The combustion chamber 118 may be of the type disclosed in Celada U.S. Pat. No. 2,900,247.

The volume of oxygen-containing gas used and the temperature to which it is preheated varies depending upon the oxygen content of the gas. Thus if pure oxygen is used, the preheating step can be omitted entirely if desired, and there is little advantage in using a temperature greater than say 500°C. If, on the other hand, air is used as the oxygen-containing gas, it should desirably be preheated to a temperature of 700°C. or greater. Similarly, if air is used as the oxygen-containing gas, the volumetric ratio of air to the reducing gas with which it is mixed may be as high as 0.4:1 and is typically in the range 0.15:1 to 0.30:1. If, on the other hand, oxygen is used as the oxygen-containing gas, a volumetric ratio within the range 0.05:1 to 0.15:1 will usually give acceptable results.

As pointed out above, it is also possible to use a superheater between the heater 88 and reactor 12, such a superheater being indicated in dotted lines and identified by the numeral 122. The superheater reduces the requirement for oxygen-containing gas in combustion chamber 118 and in some cases may eliminate the need for adding an oxygen-containing gas to the hot reducing gas.

From the combustion chamber 118 the hot reducing gas at a temperature of 900° to 1100°C., preferably about 1025°C. flows into reactor 12 and down through the ore bed to effect a reduction of the ore to sponge metal. As will now be described, a substantial proportion of this gas is recycled to produce a relatively high mass flow rate of the gas and thereby greatly accelerate the reduction process in the reactor.

The effluent gas from reactor 12 leaves the reactor near the bottom thereof through a pipe 124 and passes through a quench cooler 126, wherein it is cooled and de-watered, to pipe 128. Pipe 128 is connected to a gas transfer header 64 by a branch pipe 130 containing an open valve 132, as well as to the cooling gas recycle header 58 by a pipe 134 containing a valve 136 which is closed during the portion of the cycle here being described and to a transfer pipe 125 containing a closed valve 129 and leading to the heater 94 of reactor system 14.

It may be noted parenthetically at this point that the reactor 14 is provided with a quench cooler 135 similar to coolers 50 and 126 of reactors 10 and 12, respectively, as well as similarly associated piping including a branch pipe 137 containing a valve 138 connected to header 64, a branch pipe 139 containing a valve 140 connected to header 58 and a gas transfer pipe 141, containing a closed valve 143 and leading to the pipe 78 of the reactor 10 system. Valves 138, 140 and 143 are all closed during the portion of the cycle now being described.

Reverting now to the effluent gas from reactor 12 which flows through pipe 130 to header 64, as indicated at the lower right-hand part of FIG. 1, a small proportion of this gas is withdrawn from the system through a pipe 142 and flows to a fuel header (not shown). The withdrawn gas, either with or without admixture with other combustible gases such as methane, can be used as a fuel to supply heat for the reformer 16 or the heaters 82, 88, 94 and 100 or for other heating purposes as desired. The major portion of the gas entering header 64 through pipe 130 is recycled to the reduction reactor 12 via a pump 70, pipe 72, header 76, pipe 84, heater 88 and pipe 120. A flowmeter 74 is provided at the discharge of pump 70 to indicate the amount of gas being recirculated. The volumetric ratio of recycled gas to total gas flow through the reactor may vary from say 0.3:1 to 0.9:1 with the preferred range of ratios being from about 0.6:1 to 0.8:1.

During the period that reactor 10 is operating as a cooling reactor and reactor 12 is operating as a reduction reactor, the charging reactor 14 is effectively disconnected from the gas flow system by closure of valves 129, 92, 138, 140, 143, 46 and 116. During this period the cooled sponge metal is removed at the bottom of reactor 14 and the reactor is charged with ore for the next operating cycle.

At the end of a cooling and reduction cycle as described above, the reactors are functionally rotated so that reactor 10 becomes the charging reactor, reactor 12 becomes the cooling reactor and reactor 14 becomes the reduction reactor. More particularly, valves 108, 80, 62 56, 55, 38 and 143 are closed to isolate reactor 10 from the gas flow portions of the system so that it can be unloaded and recharged. Valves 42, 136 and 129 are opened and valves 112, 86 and 132 closed to provide for recirculating of cooling gas through reactor 12. Valves 46, 140 and 143 are left closed and 116, 92 and 138 are opened to provide for recirculation of hot reducing gas through reactor 14. Valve 129 is opened to provide for a portion of the cooling gas to be transferred to the reducing gas cycle.

It has been found that by using recirculation of gas in the cooling and reduction reactors and particularly a relatively high rate of recirculation of hot reducing gas in the reducing reactor, the desired reduction of the ore, which is normally a relatively slow process, can be achieved in approximately the same period of time required to carry out the cooling and recharging operations, and thus a semi-continuous batch reaction system having only three reactors becomes feasible. Another advantage of recycling the reducing gas is that with the high gas flow rate obtained the temperature gradient through the bed is reduced, that is, the bed temperature is more nearly uniform and has a higher average temperature value for a given feed temperature. Also the high mass flow rate of gas results in more nearly uniform metallization.

Referring next to FIG. 2 of the drawings, the system there shown corresponds generally to that of FIG. 1 but differs therefrom in that a single heater is provided for supplying the hot reducing gas to the reduction reactor. The reactors 210, 212 and 214 correspond, respectively, to the reactors 10, 12 and 14 of FIG. 1. Cooling gas from the reformer 226 is supplied to the cooling gas supply header 232 and flows through branch pipe 236 to the reactor 210 and thence down through the bed of to the reactor 210 and thence down through the bed of ferrous material therein to cool it. The cooling gas is removed from the bottom of reactor 210 and flows via cooler 250, branch pipe 254, recycle header 258, recirculating pump 266, header 232 and branch pipe 236 back to reactor 210. A flow meter 267 is provided after the discharge of pump 266 to measure the flow of recirculated cooling gas through header 232. During the cooling cycle in reactor 210 the hot gas connections thereto are cut off.

A portion of the recycled cooling gas is removed near the suction of pump 226 through a pipe 350 containing a flow meter 352 and then flows through pipe 354 to a heater 356 wherein it is heated to a temperature of the order of 700° to 850°C. The effluent hot gas from heater 356 flows to a hot reducing gas header 358 which is connected by branch pipe 360 containing valve 362 to the combustion chamber 363 of reactor 210, by branch pipe 364 containing valve 366 to the combustion chamber 367 of reactor 212 and by branch pipe 368 containing valve 370 to the combustion chamber 371 of reactor 214. During the period that reactor 212 operates as a reducing reactor, valves 362 and 370 are closed and valve 366 is open. Thus all of the effluent hot gas from heater 356 flows to combustion chamber 367 of reactor 212.

As previously described in connection with combustion chamber 118 of reactor 12, the hot reducing gas is mixed with a small quantity of oxygen-containing gas which burns a small amount of the reducing gas to achieve a mixture having the desired temperature for introduction into the reducing reactor. More particularly, an oxygen-containing gas such as air or oxygen is supplied through a pipe 386 containing a flow controller 388 to a heater 390 wherein the air or oxygen is preheated to a temperature of say 500° to 850°C. From heater 390 the preheated oxygen-containing gas flows to a hot oxygen-containing gas header 392 which is connected by a branch pipe 394 containing valve 396 to combustion chamber 363 of reactor 210; by a branch pipe 398 containing valve 400 to the combustion chamber 367 of reactor 212; and by a branch pipe 402 containing valve 404 to the combustion chamber 371 of reactor 214. During the portion of the cycle now being described valves 396 and 404 are closed and valve 400 is open.

The hot reducing gas flows downwardly through the bed of ore in reduction reactor 212 and largely reduces the ore therein to metal. If desired, there may be interposed between heater 356 and combustion chamber 367 a superheater indicated by dotted lines at 406 and corresponding superheaters may be provided for reactors 210 and 214.

As in the case of the system of FIG. 1, a substantial proportion of the reducing gas flowing through reduction reactor 212 is recycled. More particularly, the effluent gas from the reactor 212 passes through cooler 326 and branch pipe 330 to a recycle header 378, recycle pump 380 and pipe 354, which contains flow controller 382, back to the heater 356. The proportion of recycle gas may be the same as discussed above in connection with FIG. 1. A small amount of the effluent gas from reactor 212 is removed from header 378 through a pipe 384 and used as a fuel as described in connection with FIG. 1.

At the end of a reduction cycle the connections to the reactors are switched to make reactor 210 a charging reactor, reactor 212 a cooling reactor, and reactor 214 a reduction reactor. Since this switching operation has already been described in connection with FIG. 1, it need not be repeated here.

From the foregoing description it should be apparent that the present invention provides a method for achieving the several objectives set forth at the beginning of the present specification. Since the ore reduction step of the process ordinarily proceeds relatively slowly, it has been thought necessary to use at least two reduction reactors connected in series and a reduction cycle of about 3 hours. Applicant has found that by recycling the reducing gas as disclosed herein, an acceptable degree of reduction can be obtained in less than 3 hours even though only one, rather than two, reduction reactors is used.

Another advantage of using a recycle of the reducing gas is that the high mass flow rate of gas thus obtained results in a more nearly uniform metallization. Also when using a high gas flow rate, the temperature gradient through the bed is reduced, that is to say, the bed temperature is more nearly uniform and has a higher average value for a given feed gas temperature.

It is, of course, to be understood that the foregoing description is illustrative only and that numerous other ingredients, proportions and operating conditions can be used without departing from the scope of the invention as defined in the appended claims. For example, as pointed out at the beginning of the specification, the present method may be used in the reduction of ores other than iron ore, e.g., ores of metals such as nickel, copper, tin, titanium, barium and calcium. Other modifications within the scope of the invention will be apparent to those skilled in the art.

We claim:

1. In a method for the batchwise gaseous reduction of metal oxides to metals in a multiple unit reactor system of the type in which separate bodies of metal-bearing material are simultaneously treated in one or more charging reactors, reduction reactors, and cooling reactors and a reducing gas is passed successively through said cooling and reduction reactors, the improvement which comprises passing a cool reducing gas composed largely of carbon monoxide and hydrogen through a body of largely reduced metal oxide in a cooling reactor, cooling the effluent gas from said cooling reactor, recirculating a portion of the cooled effluent gas through the body of reduced metal oxide in said cooling reactor, heating the remainder of said cooled effluent gas to a temperature of 900° to 1100°C., passing said heated gas through a body of metal oxide in a reduction reactor, recirculating to said reduction reactor a portion of the effluent gas from said reduction reactor mixed with said remainder of said effluent gas from said cooling reactor, and removing the remainder of the effluent gas from said reduction reactor from said system.

2. A method according to claim 1 wherein the effluent gas from said reduction reactor is cooled to remove water therefrom and then reheated before being returned to said reduction reactor.

3. A method according to claim 1 wherein the volumetric ratio of recirculated gas to total gas passing through the reduced metal oxide in said cooling reactor is from about 0.5:1 to 0.9:1.

4. A method according to claim 1 wherein the volumetric ratio of recirculated gas to total gas passing through the body of metal oxide in said reduction reactor is from about 0.5:1 to 0.9:1.

5. In a method for the batchwise gaseous reduction of metal oxides to metals in a multiple unit reactor system of the type in which separate bodies of metal-bearing material are simultaneously treated in one or more charging reactors, reduction reactors, and cooling reactors and a reducing gas is passed successively through said cooling and reduction reactors, the improvement which comprises passing a cool reducing gas composed largely of carbon monoxide and hydrogen through a body of largely reduced metal oxide in a cooling reactor, cooling the effluent gas from said cooling reactor, recirculating a portion of the cooled effluent gas through the body of reduced metal oxide in said cooling reactor, heating the remainder of said cooled effluent gas to a temperature of 700° to 850°C., mixing the heated gas with a minor amount of an oxygen-containing gas to form a reducing gas mixture at 900° to 1100°C., passing the resulting mixture through a body of metal oxide in a reduction reactor, cooling the effluent gas from said reduction reactor, recirculating to said reduction reactor a portion of the cooled effluent gas from said reduction reactor mixed with said remainder of said effluent gas from said cooling reactor, said mixture being heated as described above before being introduced into said reduction reactor, and removing the remainder of the effluent gas from said reduction reactor from said system.

6. A method according to claim 5 wherein said oxygen-containing gas is preheated before being mixed with said heated gas.

7. A method according to claim 5 wherein the oxygen-containing gas is air and the volumetric ratio of air to heated reducing gas is from about 0.10 to 0.3.

8. A method according to claim 5 wherein the oxygen-containing gas is oxygen and the volumetric ratio of oxygen to heated reducing gas is from about 0.05 to 0.15.

9. A method according to claim 1 wherein, while said reduced metal oxide is being cooled in said cooling reactor and said metal oxide is being reduced in said reduction reactor, cooled reduced metal is being discharged from a third reactor and said third reactor is being charged with metal oxide to be reduced.

* * * * *